US008317032B2

(12) United States Patent
Crezee

(10) Patent No.: US 8,317,032 B2
(45) Date of Patent: Nov. 27, 2012

(54) SYSTEM FOR SORTING AND PACKAGING FRUIT

(75) Inventor: Leonardus Crezee, Sneirewaard (NL)

(73) Assignee: FPS Food Processing Systems B.V., Nootdorp (NL)

( * ) Notice: Subject to any disclaimer, the term of this patent is extended or adjusted under 35 U.S.C. 154(b) by 701 days.

(21) Appl. No.: 12/281,879

(22) PCT Filed: Mar. 6, 2007

(86) PCT No.: PCT/NL2007/050089

§ 371 (c)(1), (2), (4) Date: Dec. 3, 2008

(87) PCT Pub. No.: WO2007/102732

PCT Pub. Date: Sep. 13, 2007

(65) Prior Publication Data

US 2009/0218257 A1 Sep. 3, 2009

(30) Foreign Application Priority Data

Mar. 6, 2006 (EP) .................................... 06075520

(51) Int. Cl.
*A01K 43/04* (2006.01)

(52) U.S. Cl. ......... 209/505; 209/509; 209/555; 209/900

(58) Field of Classification Search .................. 209/555, 209/559, 900, 510, 511, 552; 194/433, 431, 194/370.12, 370.07
See application file for complete search history.

(56) References Cited

U.S. PATENT DOCUMENTS 2,993,592 A * 7/1961 Mumma ....................... 209/510
3,342,012 A * 9/1967 Reading .......................... 53/494
3,351,145 A 11/1967 Mumma
4,106,628 A 8/1978 Warkentin et al.
4,205,752 A * 6/1980 Malvick et al. ............... 209/564
4,246,098 A * 1/1981 Conway et al. ............... 209/558
4,293,272 A * 10/1981 Jellema ...................... 414/744.5
4,396,109 A * 8/1983 Nambu ......................... 198/431
4,569,444 A * 2/1986 McEvoy et al. .............. 209/510
4,583,636 A 4/1986 Tas
4,765,487 A 8/1988 Bliss
4,787,799 A * 11/1988 Platteschorre ............. 414/789.1

(Continued)

FOREIGN PATENT DOCUMENTS

EP 644120 3/1995

(Continued)

*Primary Examiner* — Stefanos Karmis
*Assistant Examiner* — Michael E. Butler
(74) *Attorney, Agent, or Firm* — Stites & Harbison PLLC; Marvin Petry

(57) ABSTRACT

A system for sorting and packaging products, chosen from the group consisting of eggs and fruit (10), the system comprising: —a sorting machine with at least one single sorting track (1) with carriers; —at least one sensor for determining at least one characteristic of each product (10); —the control being adapted to classify a said product in accordance with the at least one characteristic; —a plurality of packaging conveyors (2) for supplying and discharging packaging units, such as boxes, crates or trays, crossing the sorting track and extending above the sorting track; —wherein adjacent each packaging conveyor a transferring device (3) is provided at the level of or higher than the packaging conveyor, arranged for taking over a said product from a carrier and for placing the product from above into a packaging unit (20) on the corresponding packaging conveyor.

11 Claims, 1 Drawing Sheet

U.S. PATENT DOCUMENTS

Figure 1:
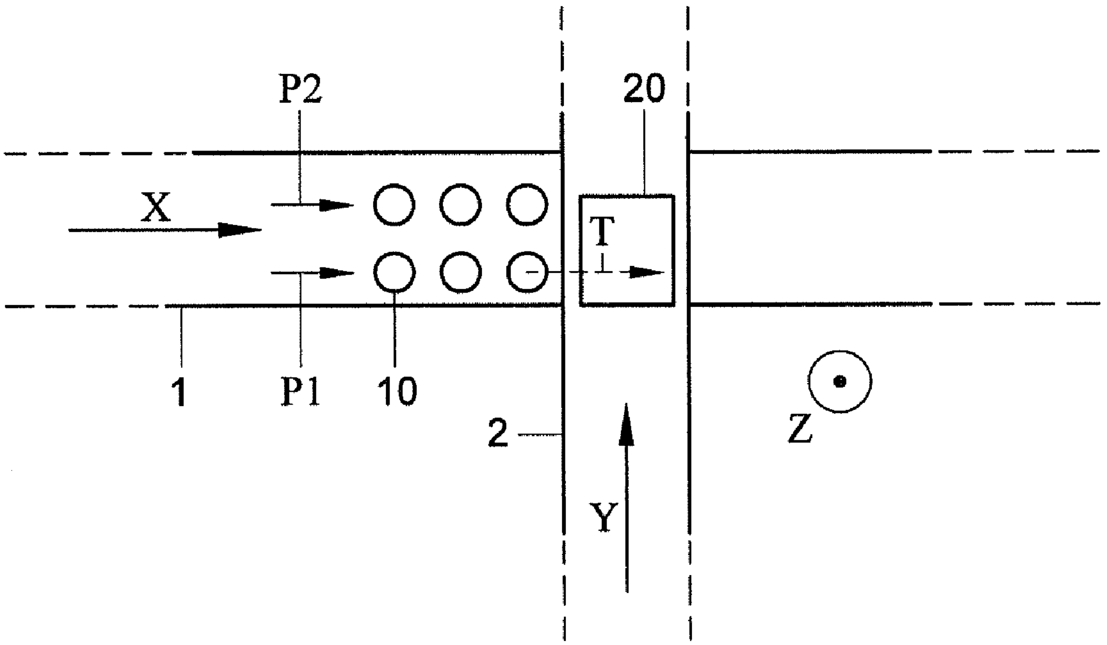

| | | | | |
|---|---|---|---|---|
| 4,811,551 | A | 3/1989 | Nambu | |
| 5,101,954 | A * | 4/1992 | Nambu | 198/370.04 |
| 5,306,877 | A | 4/1994 | Tas | |
| 5,533,442 | A * | 7/1996 | Tateno | 99/541 |
| 5,703,332 | A | 12/1997 | Tas | |
| 5,778,640 | A * | 7/1998 | Prakken et al. | 53/475 |
| 6,029,424 | A * | 2/2000 | McEvoy et al. | 53/443 |
| 6,290,454 | B1 * | 9/2001 | Huang et al. | 414/799 |
| 7,383,945 | B2 * | 6/2008 | Bekelaar et al. | 198/867.15 |
| 7,409,812 | B2 * | 8/2008 | Gilmore et al. | 53/475 |
| 2006/0210386 | A1 | 9/2006 | Neutal | |
| 2007/0000224 | A1 * | 1/2007 | Meester | 56/327.1 |

FOREIGN PATENT DOCUMENTS

| | | |
|---|---|---|
| JP | 10004816 | 10/1998 |

* cited by examiner

SYSTEM FOR SORTING AND PACKAGING FRUIT

The present invention relates to a system for sorting and packaging products, chosen from the group consisting of eggs and fruit.

Such a system is generally known in the field of technology of, for instance, sorting fruit and vegetables. An example of a sorting machine forming part of such a system is described in EP687508. The sorting machine referred to therein conveys the products with grippers which take up the products after they have been classified, and releases these products onto a packaging conveyor in accordance with their grade. This packaging conveyor has the form of, for instance, a discharge channel of a conveyor belt, or of a conveyor with crates, cases or boxes placed thereon. In a customary manner, such packaging conveyors follow conveying paths or conveying routes that cross the path or route of the supply conveyor and pass underneath. Therefore, release of the products takes place downwards with the products following a fall trajectory. It will be clear to all those skilled in the art that when travelling such a fall trajectory, not only can the fruit become damaged, but also, the landing position is poorly defined.

In contrast with the past, when consumers purchased fruit that was gathered and then collected into bags, it becomes more and more customary to package fruit in advance in small packaging units, for instance in small boxes or trays, while in advance, particular combinations and amounts are assembled.

A different type of sorting machine is described in, for instance, EP 108445. In this sorting machine, the products, laid in cups, are conveyed to their releasing position. In particular products that are difficult to manipulate with grippers or forks, such as pears or cucumbers, are processed with such a type of sorting machine. However, it will be clear that precisely these products, when released in downward direction, can be damaged considerably, more in particular pears as the skin of this type of fruit is very delicate, and cucumbers because their shape deviates strongly from the more customary, substantially round shape.

It will further be clear to all those skilled in the art that the demand for traceability of product properties becomes more and more prevalent.

Processing and packaging such products while maintaining all classification data, wherein these data vary, in general, even per product, is not possible with the known sorting apparatus and systems, for instance with a machine as described hereinabove.

In order to meet such demands and other demands, the invention provides a system for sorting and packaging products, chosen from the group consisting of eggs and fruit, the system comprising

- a sorting machine with at least one single sorting track with carriers each arranged for carrying a single fruit and each defining a position in the sorting track;
- the sorting machine being provided with at least one sensor for determining at least one characteristic of each product,
- a control for storing the at least one characteristic of a said product together with the position of the carrier carrying said product so that each carrier position is coupled to the at least one characteristic of the product conveyed therewith,
- the control being adapted to classify a said product in accordance with the at least one characteristic of said product

- the sorting track extending substantially in a horizontal direction and, in use, having a conveying speed in a substantially horizontal conveying direction (X),
- a plurality of packaging conveyors for supplying and discharging packaging units, such as boxes, crates or trays, in which, in use of the system, the products carried by the carriers are to be packaged;
- at least a number of the plurality of packaging conveyors crossing the sorting track and extending above the sorting track;
- wherein adjacent each packaging conveyor crossing the sorting track and extending above the sorting track a transferring device is provided at the level of or higher than the packaging conveyor, the transferring device being arranged for taking over a said product from a carrier of the sorting track, for transferring the product to a level above the packaging unit and for placing the product from above into a the packaging unit on the corresponding packaging conveyor;
- the control being arranged for controlling the transferring devices such that each product is transferred in accordance with its classification to a packaging conveyor to which that classification has been assigned, and
- wherein the control is adapted for, inter alia, controlling the conveying speed of the sorting machine, of the transferring devices, and of the packaging conveyors so that these are geared to each other.

Such a structure of a sorting system enables, in a highly suitable and effective manner, a manner of processing strongly resembling human handling, i.e. picking up and laying down from above. A further considerable advantage resides in the fact that from each product, which has been classified in the sorting machine, the characteristics and the properties remain known even after transfer because each product is transferred into the packaging unit individually. Thus, in a highly advantageous manner, optionally even within a certain class of products, specific combinations of products can be realized in a packaging unit, precisely because of the fact that from each product these characteristics and properties are known and remain known at least until the products are placed in the package unit.

Because the transferring devices are provided at the level of or higher than the packaging conveyor, which packaging conveyer is extending above the sorting track, the transferring device is easily accessible. This is advantageous when the system is assembled and maintained. Further, in many cases the transferring distance to be bridged by the transferring device can be kept short. Consequently, the transferring time needed can be kept short, resulting in a high capacity of the device. Thus the various possibilities of the transferring devices, e.g. in the embodiment of robots or manipulators, can be used optimally.

In further exemplary embodiments of the present invention, the transferring device for transferring the products operates per track in substantially a single plane. Such a transferring device per track is relatively simple and can move very quickly. Preferably, the plane extends vertical, i.e. in the Z-direction.

In such a configuration, the transferring device per track can comprise an X-Z manipulator.

In order to improve the positioning possibilities of such a transferring device, the transferring device as a whole can be pivotable through a small pivotal angle about an axis in the X-direction.

In addition, or alternatively, the transferring device can comprise a transferring head pivotable through a small pivotal angle about an axis in the X-direction.

The pivotal angle preferably is at most 5°.

In an embodiment of the invention the transferring device can further comprise at least a single intermediate conveyor. On such an intermediate conveyor the products taken over from the carriers can be placed before being placed into the packaging units. This can be advantageous when the supply of packaging units is not always guaranteed or when it is preferred to place more than one product simultaneously into a packaging unit. In those circumstances the intermediate conveyor functions as a buffer conveyor.

In an embodiment of the invention the carriers are chosen from the group consisting of cups, grippers and forks.

It will be clear to all skilled in the art that such a system comprises, in addition to the far-reaching technical simplifications, several uses that were nonexistent to date for processing fruit or eggs. More particularly, there is the possibility of assembling combinations of different sorts of fruits, or also, assembling a combination of the same sort but of different colors, in both cases packaged in trays.

A further great advantage is that such a system enables several spatial arrangements.

The use of robots or manipulators as transferring devices for transferring products is known from the foodstuff industry, according to, for instance, WO2005009690. However, the robots described therein are highly complex apparatus requiring much space and a considerable control. In the system according to the invention however, an apparatus is utilized equipped for a limited number of movements and, furthermore, easily placeable, while the operations are limited to substantially one single plane, more particular a vertical or X-Z or Y-Z plane.

Figure 2:
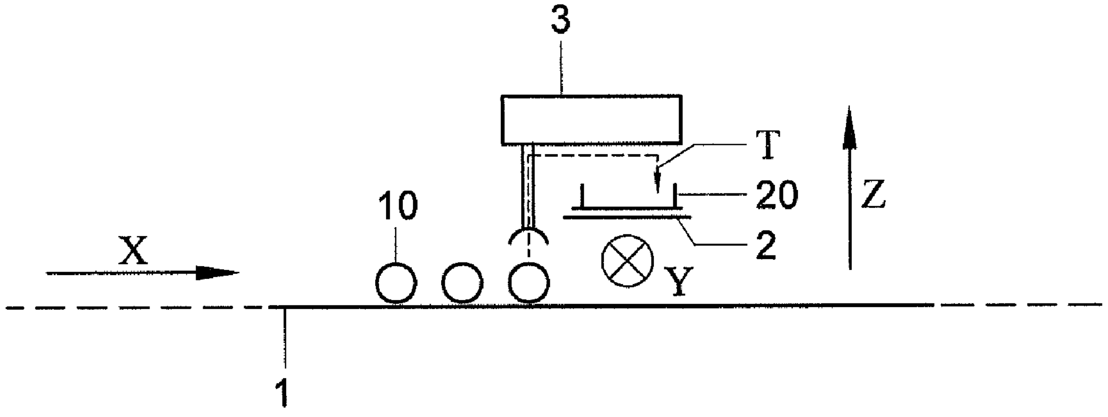

Further details of the system according to the present invention will be described on the basis of a schematic figure, wherein FIG. 1 shows a top plan view of a diagram of a part of the system according to the invention; and FIG. 2 shows a side view of the system according to FIG. 1.

In these Figures, identical parts or constituents have the same reference numeral. Further, in the Figures, X, Y and Z-directions are selected in the customary manner.

With a supply conveyor 1 defining, in this case, two sorting tracks P1, P2, moving in the X-direction, products 10 are supplied. Such a conveyor 1 is typically an endless conveyor, for instance of the type as described in EP540126, EP687508, or also EP108445, where the products are conveyed by carriers having the shape of fork-shaped hands, grippers or cups, respectively.

On such a conveyor, the carriers for products 10 occupy well-defined positions, and these positions are coupled to the properties of each product carried in such a position, while the data are collected, managed and processed with the aid of a computer program that is executed by, for instance, a central computer.

In the state of the art systems, such supply conveyors defining at least one sorting track, are further equipped with, for instance, releasing means, unlocking means, or discharge channels, which guide the product to a collecting unit in response to signals delivered by a computer control. In the present field of technology, the products are released onto discharge belts, in packaging units such as boxes or crates placed on such discharge belts and functioning here as packaging conveyors, or also in channels in which in a customary manner, water flow is effected. It will be clear that releasing always takes place downwards. In case that the packaging units are belts or conveyors, these are always endless. Upon transfer from carrier to conveyor, often, rotating brushes are used for breaking the fall of the products. In other uses, the carrier surface of a discharge belt consists of, for instance, a brush mat.

As already mentioned hereinabove, the system according to the present invention also comprises a plurality packaging conveyors 2, travelling in the Y-direction, for, for instance, conveying packaging units 20. In the figures, which only show one of the plurality of packaging conveyors for the sake of clarity, it is indicated that the conveyor 2 has a position that crosses at right angles over the supply conveyor 1. However, other angles are feasible as well. The packaging units 20 can for instance be carried along stepwise while, when standing still, they are filled with products 10. This filling with products is carried out along the top with a transferring device 3 that conveys the products along a route T from the supply conveyor 1 to the packaging conveyor 2.

Positioning the transferring device 3 above both conveyors 1, 2 ensures that gathering and laying down of products is carried out carefully as was the case with manual filling and packaging. For such a transferring device, various types of conveyors can be utilized while picking up takes place in a highly controlled manner, more particularly in a manner in which the position can be determined highly accurately while at the same time, also, the properties of the respective product are taken into consideration. This is the case in particular with robots and manipulators.

Such robots or manipulators are provided in a known manner with grippers or suction cups. Furthermore, such a robot will be connected to a central computer for picking up the correct product whose data, as is elucidated hereinabove, are linked to the carrier of the respective product. Here, it is possible to send all control signals from the central computer to the robot and to combine all data of the central computer with those of the robot control, while the robot is equipped with, for instance, a camera.

In a further exemplary embodiment, conveyance during transfer is limited to a single plane, preferably a vertical plane. In this manner, a further simplification of the transferring device is achieved. In this manner, especially more complex robots, for instance of the delta-type or of the scara-type, and more particularly the bulk and complexity thereof, can be avoided. In this exemplary embodiment, such a transferring device is called an X-Z manipulator. It is emphasized once more that in the set-up according to the invention, a single plane is envisaged that needs not per se coincide with the plane known in ordinary language as X-Z plane, but may also be disposed at an angle so that accordingly, the packaging conveyor can occupy a different angle. Further, other angles than vertical angles can be utilized.

It is true that in this field of technology, apparatus are known that fill packaging units with products while a movement is carried out in substantially a single plane. From EP644120 for instance, an apparatus is known with which a frame with several rows of suction cup pickup means is displaceable while the suction cup holders can be spread widthways. Such an apparatus is used in particular with products arranged in patterns. It is further known that upon supply of products to such an apparatus, the classified products, upon forming the patterns mentioned, loose a part of their individual classification because after release from the sorting machine, they end up randomly on a conveyor belt and still need to be supplied to a pattern forming unit, for instance a buffer belt followed by a singulator belt.

In order to enhance the manoeuvrability or flexibility of the transferring device, in a further embodiment, the transferring device 3 is rendered pivotable through a, generally, small pivotal angle, for instance of 5°, in particular in the single plane mentioned and/or perpendicular thereto. Furthermore, the transferring device can be designed such that a transferring head is of pivotal design as hand-shaped end, or gripper end.

It will be clear to all those skilled in the art that small variants on the above-described exemplary embodiments are to be understood to fall within the scope of the attached claims.

For instance, in the system a further packaging conveyor can be utilized in the customary manner, i.e. crossing underneath, while particular products, being classified, for instance, as second choice, are released downwards in a customary manner. Further, transfer devices are comprised in which in several parallel of the above-mentioned planes X-Z manipulators are accommodated so that several parallel sorting tracks can be handled simultaneously. In another exemplary embodiment, several packaging conveyors can be utilized for different combinations of characteristics and properties. The transferring device can also comprise one or even several intermediate conveyors, to function as, for instance, a buffer. An intermediate conveyor can for instance be disposed upstream of said at least single packaging conveyor, which functions as a buffer in a manner such that with it, in such a plane, more optimal time-conveyance schedules can be obtained.

The invention claimed is:

1. A system for sorting and packaging products, chosen from the group consisting of eggs and fruit, the system comprising a sorting machine with at least one single sorting track with carriers each arranged for carrying a single product and each defining a position in the sorting track;

the sorting machine being provided with at least one sensor for determining at least one characteristic of each product, a control for storing the at least one characteristic of a said product together with the position of the carrier carrying said product so that each carrier position is coupled to the at least one characteristic of the product conveyed therewith, the control being adapted to classify a said product in accordance with the at least one characteristic of said product the sorting track extending substantially in a horizontal direction and, in use, having a conveying speed in a substantially horizontal conveying direction (X), at least one packaging conveyor for supplying and discharging packaging units, in which, in use of the system, the products carried by the carriers are to be packaged, the at least one packaging conveyor located above the sorting track and crossing the sorting track at an angle thereto;

a transferring device located at the level of or higher than the at least one packaging conveyor, the transferring device being arranged to pick up a product from a carrier of the sorting track and transfer the product to a level above a packaging unit on the at least one packaging conveyor and place the product from above the packaging unit into a the packaging unit on the at least one packaging conveyor;

the control being arranged for controlling the transferring device such that each product is transferred in accordance with its classification to a packaging conveyor to which that classification has been assigned, and wherein the control is adapted for, inter alia, controlling the conveying speed of the sorting machine, of the transferring device, and of the at least one packaging conveyor so that their operations are coordinated with each other.

2. A system according to claim 1, wherein the transferring device for transferring the products is operative per track in substantially a single plane.

3. A system according to claim 2, wherein the plane is vertical in the Z direction.

4. A system according to claim 1, wherein the transferring device comprises an X-Z manipulator.

5. A system according to claim 4, wherein the transferring device is pivotable as a whole through a small pivotal angle about an axis in the X-direction.

6. A system according to claim 4, wherein the transferring device comprises a transferring head which is pivotal through a small pivotal angle about an axis in the X-direction.

7. A system according to claim 5, wherein the pivotal angle is at most 5°.

8. A system according to claim 1, wherein the transferring device further comprises at least a single intermediate conveyor.

9. A system according to claim 8, wherein the said intermediate conveyor functions as buffer conveyor.

10. A system according to claim 1, wherein the conveying speed of the sorting machine, the movements of the transferring device, and the speed of the at least one packaging conveyor are dependent on said carrier positions.

11. A system according to claim 1, wherein the carriers are chosen from the group consisting of cups, grippers and forks.

* * * * *